Jan. 31, 1967   W. SCHAFROTH ET AL   3,301,456
NAILING MACHINE

Filed Nov. 23, 1964   9 Sheets-Sheet 6

INVENTORS:
WERNER SCHAFROTH
ANTHONY E. CAIRATTI
BY Gravely, Lieder & Woodruff
ATTORNEYS.

FIG. 32

# United States Patent Office 3,301,456
Patented Jan. 31, 1967

3,301,456
NAILING MACHINE
Werner Schafroth, P.O. Box 247, Herrin, Ill. 62948, and Anthony E. Cairatti, Herrin, Ill.; said Cairatti assignor to said Schafroth
Filed Nov. 23, 1964, Ser. No. 413,045
3 Claims. (Cl. 227—120)

This invention relates to an improved nailing machine, and in particular, to a power actuated nailing machine whose head is relatively short in height. Such a machine is used to drive corrugated fasteners, nails, and heavy and long staples. Power actuated nailing machines have been used in the past, but such machines have been relatively tall with a differential piston and other numerous parts therein. When such nailing machines were designed to drive corrugated fasteners, they could not properly drive such fasteners when in nested relation and did not operate properly if the succeeding clip was not properly oriented in nested relation with the preceding clip.

One of the principal objects of the present invention is to provide a power actuated nailing machine with a lightweight piston therein, said machine having a relatively short head. Another object is to provide a construction having a thin piston to which air is applied to move the piston up and down. Another object is to provide a nailing machine that can drive nested corrugated nails or fasteners. Another object is to provide a nailing machine which is positively acting and which is made from relatively few parts which are designed to be free from trouble. Another object is to provide a novel safety device on said nailing gun to prevent its operation unless the machine is in contact with a surface into which a fastener is being driven. Another object is to provide a machine which can drive corrugated fasteners in an efficient manner whether they are nested or not. Another object is to provide a machine in which the operator merely places the corrugated fasteners with the point down in the magazine with either of its two sides forward. Another object is to provide a novel magazine in which the bottom has a sloping forward edge. Another object is to provide a method of driving a corrugated fastener in which said fastener is broken loose from its clip and then moved laterally to a new position so that it can be contacted by substantially the entire bottom of the driving blade.

These and other objects and advantages will become apparent hereinafter.

The present invention is embodied in a nailing machine having a relatively light piston therein, storage means for compressed air, a relatively short head, a valve block assembly, a novel magazine, and a safety device to prevent functioning of the machine unless the machine is in contact with a surface. The invention is also embodied in a novel driving blade, and in a method of driving a corrugated nail in which said nail is contacted over part of its top to break it loose from its clip, then moved laterally and contacted over substantially its entire top by the driving blade to drive the same.

The invention also consists in the parts and in the arrangements and combinations of parts hereinafter described and claimed. In the accompanying drawings which form part of this specification and wherein like numerals and symbols refer to like parts wherever they occur:

Referring now to the drawings in detail, it will be seen that the embodiment of the invention which has been illustrated comprises a nailing machine M having a head H and safety means S, the machine M having a handle 1 and trigger means 2, and a magazine 3 for feeding corrugated nails 4 to the head H in order to be driven by a power actuated driving blade 5. The handle 1 is hollow to form a storage reservoir 6 with an opening 7 for receiving a source of compressed air. The reservoir 6 has an upper hand grasping portion 8 and a lower portion 9 to provide for sufficient compressed air storage.

Figure 5:
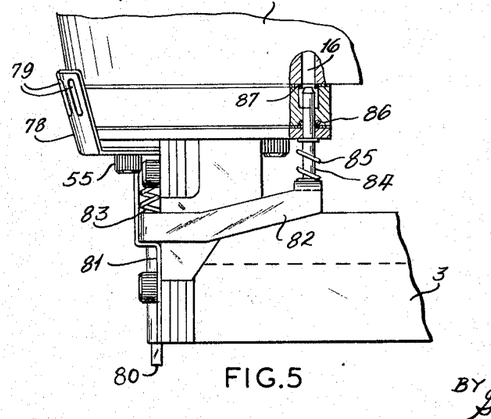
FIG. 5 is a fragmentary side view of the safety valve portion.
Figure 6:
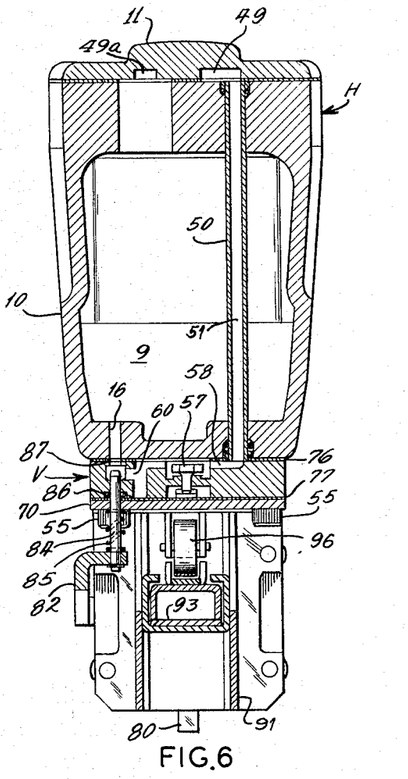
FIG. 6 is a vertical cross-sectional view taken along the line 6—6 of FIG. 2.

The head H of the nailing machine M has an upstanding casing 10 with a cap 11 thereon closing the top portion 12 of the casing 10, an inner cylinder 13 sealably secured to the casing 10 which has a bottom portion 14 with a bumper plate 15 and bumpers 15a therein. The bottom portion 14 also has a large exhaust port 17 therein. The casing also has a small safety hole 16 therein (FIGS. 5 and 6). The top 18 of the inner cylinder 13 is spaced below the lower surface of the cap 11. A main valve assembly 20 is slidably mounted in this limited vertical space in sliding relation with the inner surface 21 of said casing 10 and is adapted to seat on the top 18 of the inner cylinder 13. An annular area 19 is provided on the underside of the assembly outwardly of the cylinder 13.

The main valve assembly 20 is preferably made from nylon and has a large diametered upper portion 22 with sealing means 23 such as an O ring, in its outer peripheral edge, and a smaller diametered lower portion 24 sealed by an O ring 25 mounted in the casing 10, which is provided with small air escape holes 26 leading to the atmosphere from the space 27 between the O rings 23 and 25. The main valve assembly 20 has an upper flange 28 with an opening 29 extending completely through the height of the main valve assembly 20. The upper flange 28 or exhaust valve tube 28 extends upwardly in an opening in the cap 11 with an O ring 30 therearound so as to connect the opening 29 with an opening 31 in the cap 11. The cap 11 is also provided with a seat 32 for closing the opening 29 in the valve 20.

Figure 15:
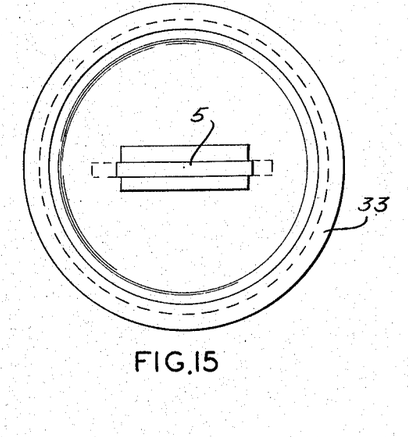
FIG. 15 is a top plan view of the main piston with the attached driver blade.
Figure 16:
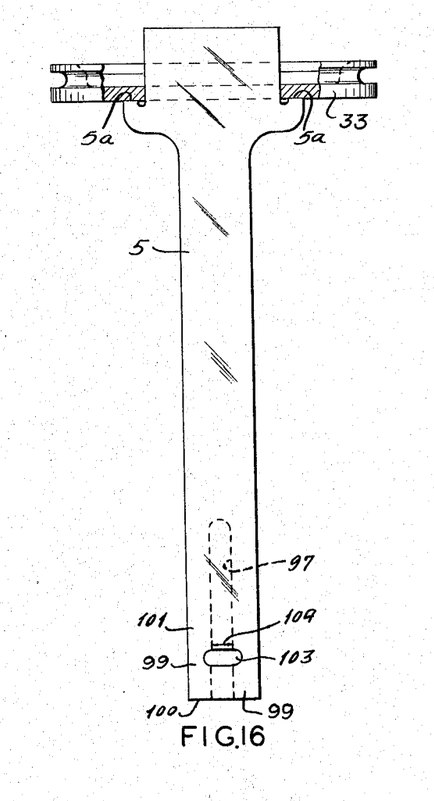
FIG. 16 is a side elevational view of the driver blade showing the lightweight connection, partly in section, between the driver blade and main piston.
Figure 17:
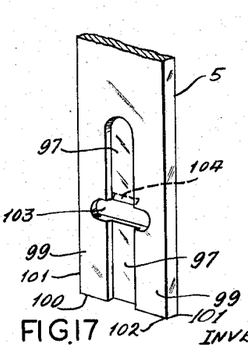
FIG. 17 is a perspective view of the lower portion of said driving blade.

The main piston 33, as shown in FIG. 15, is very simple and is made of thin metal, preferably steel, so as to be leakproof and light in weight. The main piston 33 has a central opening 34 for receiving the upper end of the driving blade 5, and sealing means 35, such as an O ring, in its outer peripheral margin. Thus, an upper chamber 36 is formed between the cap 11 and main valve assembly 20 and a piston chamber 37 between said assembly 20 and main piston 33 and a lower chamber 38 beneath said piston 33. The flat blade 5 is inserted into the opening 34 until the shoulders 5a abut against the underside of the piston 33, and the two parts are welded or soldered together to make them air tight (FIGS. 15 and 16).

Figure 7:
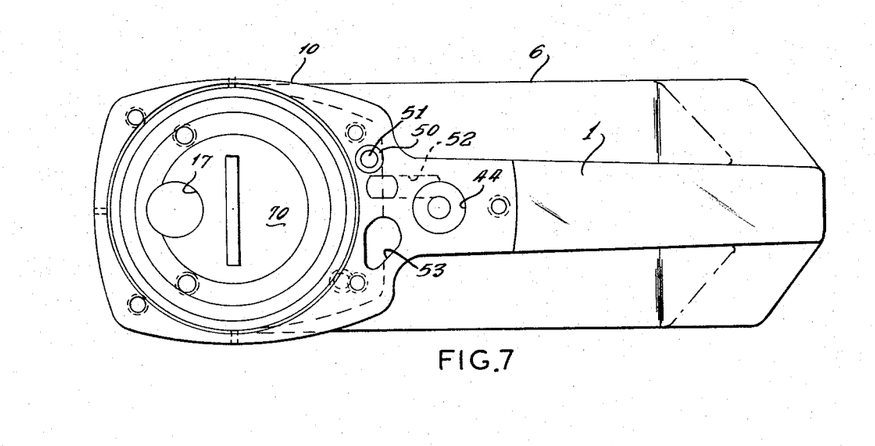
FIG. 7 is a top plan view, without the cap or main valve assembly or main piston.

The handle 1 is provided with handhold 39 and a pivot pin 40 on which is mounted the trigger 2 for actuating the nailing machine M. A plunger 41 contacts the trigger 2 and moves vertically within an enlarged opening 42 in the casing 10 in alignment with a valve ball 43 positioned within a recess 44 and held by a valve collar 45, an upper washer 46 and lower washer 47 each having an opening 48 therein. The recess 44 connects with a passage 49a in the cap 11. The passage 49a connects with a passage 53 which connects with the reservoir 6. A feeder tube 50 with a passage 51 therein connects a passage 49 in the cap 11 with a valve block V. The passage 49 connects the upper chamber 36 to the passage 51. The valve collar 45 has an opening leading to a passage 52 which connects with the passage 51. The opening 48 in the upper washer 46 connects with a passage 49a in the cap 11 which connects with a passage 53 which connects with a reservoir 6. The passage 51 in the feeder tube 50 connects with a passage 49 and with the chamber 36. If the cap 11 were in position in FIG. 7, the passage 49a would connect the opening 48 at the top of the recess 44 with the passage 53.

Figure 1:
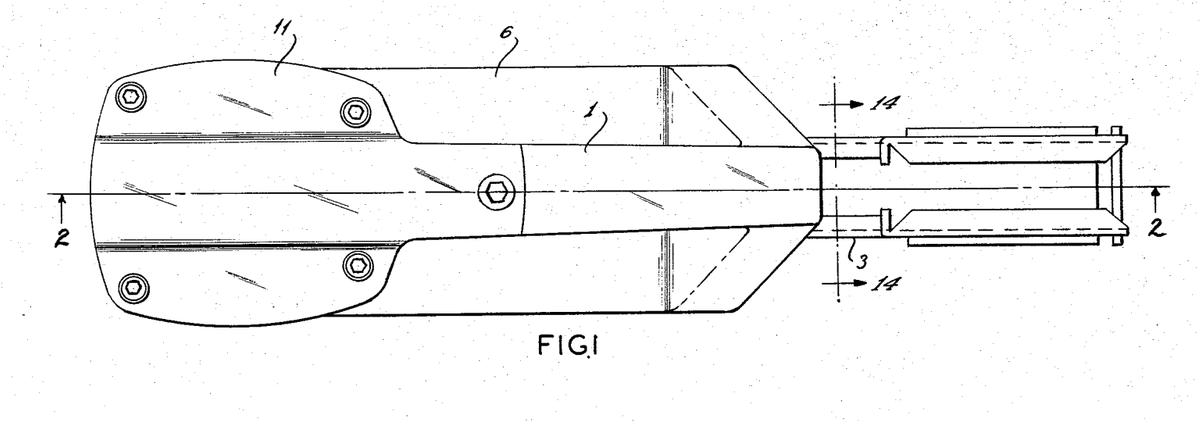
FIG. 1 is a top plan view of a nailing machine embodying the present invention.
Figure 2:
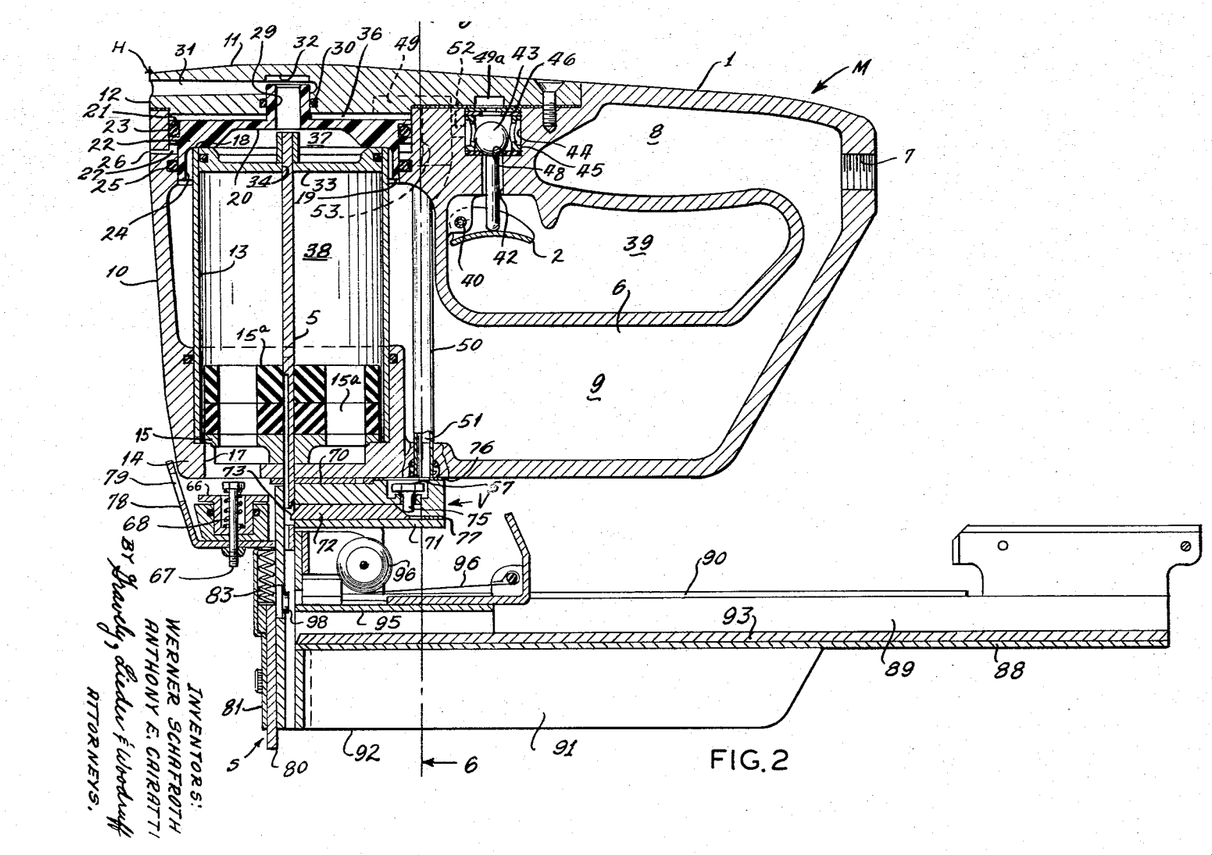
FIG. 2 is a longitudinal cross-sectional view of said machine along the line 2—2 of FIG. 1, showing the driving piston in its upper position and the main valve assembly and trigger in their lower positions.
Figure 8:
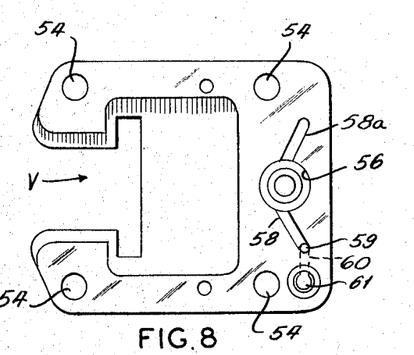
FIG. 8 is a top plan view of the valve block.
Figure 9:
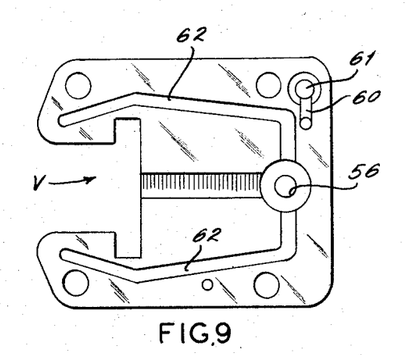
FIG. 9 is a bottom view thereof.
Figure 10:
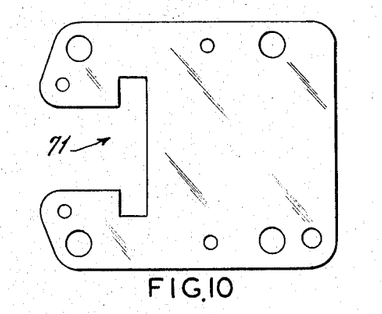
FIG. 10 is a top plan view of the valve block plate.
Figure 11:
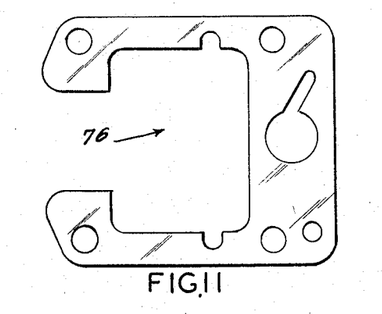
FIG. 11 is a top plan view of the valve block upper gasket.
Figure 12:
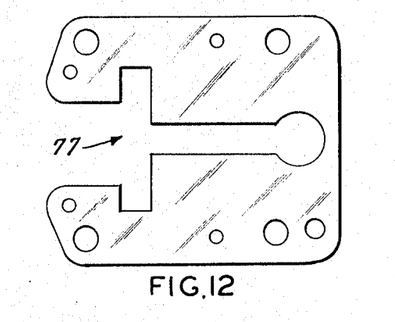
FIG. 12 is a top plan view of the valve block lower gasket.
Figure 13:
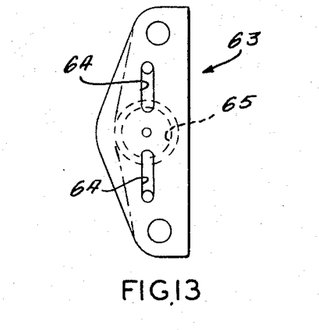
FIG. 13 is a top plan view of the valve block.
Figure 14:
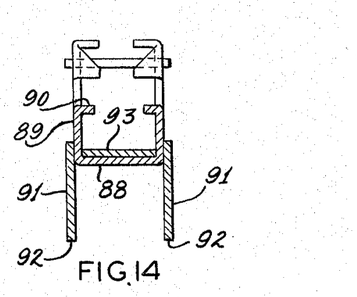
FIG. 14 is a cross-sectional view through the magazine and line 14—14 in FIG. 1.

The valve block V, best shown in FIGS. 2, 8 and 9, contains four holes 54 for receiving bolts 55 which secure it to the casing 10. The valve block V has a large rear upper hole 56 with a poppet valve 57 therein. Passages 58 and 58a extend from the hole 56, one passage 58 to a vertical hole 59 having a lateral passage 60 which extends into a vertical safety hole 61. The other passage 58a connects the hole 56 with the passage 51 in the feeder tube 50. The bottom of the valve block V has two passages 62 (FIG. 9) extending forwardly to a valve block piston feeder 63 having feeder passages 64 (FIG. 13) therein leading to an opening 65 which slidably receives a relief valve 66. The relief valve 66 is provided with a valve retainer rod 67 with a spring 68 therearound. An O ring 69 circumscribes the relief valve 66. The valve block V also has a guide plate 70 in its upper portion for guiding the driving blade 5. A plate 71 is positioned below the valve block V. A valve recovery bar 72 is slidably mounted in the valve block V and has a forward sloping surface 73 adapted to be contacted by the driving blade 5, and a rear sloping surface 74 adapted to contact the stem 75 of the poppet valve 57. An upper gasket 76 (FIG. 11) and a lower gasket 77 (FIG. 12) are applied in sealing relation to the top and bottom of the valve block V.

The relief valve 66 is adapted to move within the valve block piston feeder 63 and to close the exhaust opening 17 in the bottom of the casing 10. To protect these parts, a valve shield 78 is provided and has holes 79 in its forward portion.

The nailing machine M is provided with a trip safety valve S having a foot 80 which extends vertically within a housing 81 on the front of the machine to a safety valve arm 82. A front spring 83 is provided to bias the foot 80 downwardly. The arm 82 has a shaft 84 with a spring 85 therearound at its rear portion, said shaft 84 extending upwardly into the opening 61 in the valve block V, there being a bottom sealing ring 86 and a top sealing ring 87 around the safety hole 61 which extends upwardly into the safety hole 16 leading to the reservoir 9. In the inoperative position, the front spring 83 biases the foot 80 of the trip safety valve S downwardly so that it extends about one-fourth of an inch beneath the bottom of the machine M.

The magazine 3 is made from a U-shaped channel member having a lower portion 88 and two upstanding sides 89 whose upper edges 90 are inturned. The magazine 3 is supported in an elevated position from the bottom of the machine by means of gussets 91 which have a flat bottom surface 92. An insert or bottom 93 whose forward edge 94 slopes at about a 15° angle is positioned on said lower portion 88. A pusher 95 is free to slide in said magazine 3 on said insert 93 under the influence of a spring 96.

The driving portion and safety means are substantially the same as shown in our co-pending application Serial No. 399,152, filed September 25, 1964 entitled "Nailing Machine," with which the present application has subject matter in common. The present invention is embodied in a driving blade and magazine arrangement for driving clips of nested or unnested staples which may be inserted into the magazine in random fashion and in the method of driving said corrugated fasteners.

The driving blade 5 has a slot or central cut-out portion 97 to straddle a rigid bolt head or stop 98, there being thick edge portions 99 on either side of said slot 97. The bottom edge 100 of the driving blade 5 is flat all the way across at the rear 101, but interrupted at the slot 97 at the front 102 thereof.

The driving blade 5 is also provided with an opening 103 having a horizontal top edge with a sloping portion 104 thereabove, which forms a false bottom for the driving blade 5 in order to operate the mechanism in the valve block V at the proper instant, so that the same power unit may be used with either corrugated fasteners, which are usually about one-half inch in height, or with nails, which may be 2.5 inches long. The top edge of the opening 103 is at a predetermined distance from the bottom edge of the blade 5. This distance on different machines will vary in accordance with the length of the nails to be driven. Therefore, the same power unit can be used and only different blades and magazines need be used to drive nails of different length.

The driving blade 5 moves vertically within a guide path 105 formed between front guide means 106 and rear guide means 107. The front guide 106 supports the stop means 98.

Figure 18:
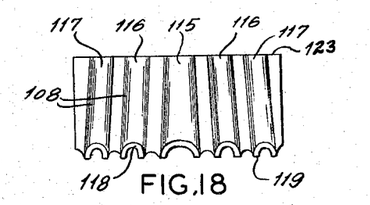
FIG. 18 is an enlarged side elevational view of a corrugated nail or fastener.
Figure 19:
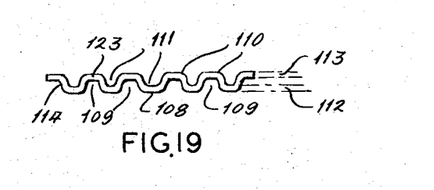
FIG. 19 is an enlarged top view of said corrugated nail.
Figure 20:
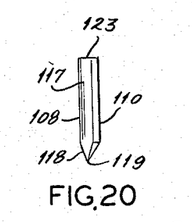
FIG. 20 is an enlarged end view thereof.

The details of a typical corrugated nail 4 are best shown in FIGS. 18–20. Each nail 4 is about one inch wide and three-eighths or one-half inch high, although these dimensions may vary, especially since such nails come in various sizes. Typical nails of this sort are made from steel about 0.0025 inch thick. The nails have a forward or 5 rib face 108 with four forward spaces 109 therebetween, and a rearward or 6 rib face 110 with five rear spaces 111 therebetween. Thus, there is formed a forward thickness 112 and a rear thickness 113 with connecting portions 114 therebetween. With the nail shown, the forward face 108 has a central rib 115, two intermediate ribs 116, and two end ribs 117, or a total of five ribs, each having tapered or sloping bottom portions 118 which terminate in points 119. The rear or 6 rib face 110 has two central ribs 120, two intermediate ribs 121 and two partial end ribs 122. Thus the faces 108 and 110 are each symmetrical, but each is different from the other. The nail 4 has a flat top 123 of serpentine shape, so that its total width is about 0.09 inch. The ribs preferably slope or taper so that as the corrugated nail is driven between two contacting boards, it tends to bring them together.

The clip C is made from a plurality of nested corrugated fasteners 4 oriented in the same direction. The clip C is formed by placing the flat top edges 123 of the fasteners 4 on a flat surface, with succeeding fasteners being in close contacting and nested relation. An adhesive retains the fasteners 4 together in clip form, since it is poured over the points 119 and allowed to flow downwardly between the fasteners 4 to solidify thereby forming the clip. The adhesive preferably is a cellulose base with a lacquer thinner, so that it dries rapidly and holds the fasteners 4 together in clip form during shipment, so that the clips C are not broken in transit.

Each fastener 4 is made of steel about 0.0025 inch thick with five diverging ribs, each with two points 119 thereon. The projected width of each fastener is about 0.090 inch. Usually ribs of one fastener nest or fit into the spaces of the adjacent fastener, so that a flat bottom of the driving blade would ordinarily contact at least two fasteners if it were 0.090 inch wide. The present driving blade 5 is designed to contact the forward projected top edge 112 of the fasteners at five or six places (depending upon the position of the fastener) to break it loose, and then pivot the fastener to a vertical position so that its entire projected 0.090 inch top area is directly beneath the 0.090 inch driving blade.

Figure 26:
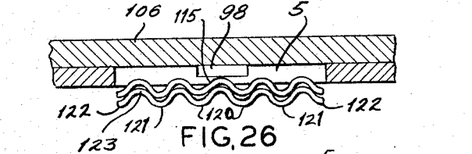
FIGS. 26 and 27 are sections along the line 26—26 of FIG. 21 showing nails in different orientation against the stop means.
Figure 27:
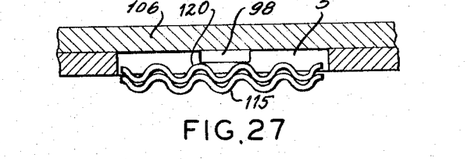
Figure 28:
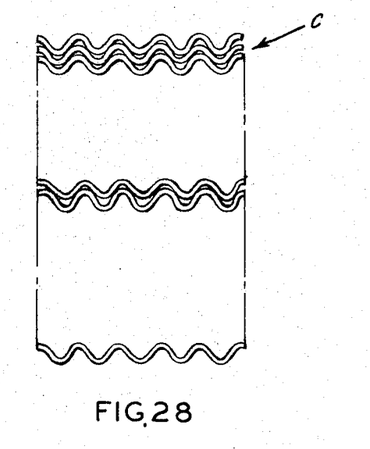
FIG. 28 is a fragmentary view of two clips in nested relation.
Figure 29:
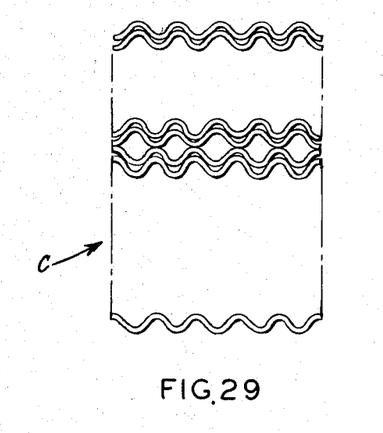
FIG. 29 is a fragmentary view of two clips in opposed relation with the end corrugations of each clip not nesting.
Figure 30:
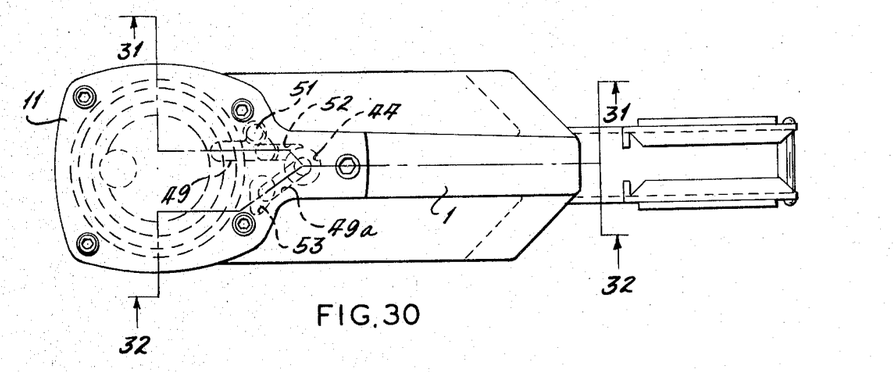
FIG. 30 is a top plan view of the machine showing various passages in dotted lines.
Figure 31:
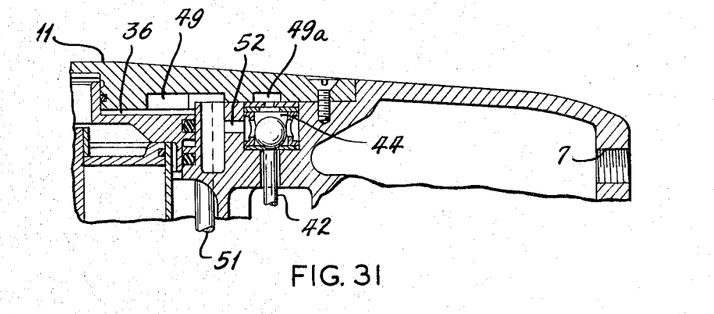
FIG. 31 is a fragmentary sectional view taken along the line 31—31 of FIG. 30.
Figure 32:
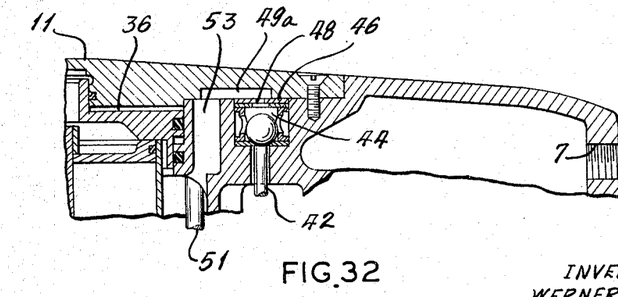
FIG. 32 is a fragmentary sectional view taken along the line 32—32 of FIG. 30.

The purpose of the stop 98 is best shown in FIGS. 26 and 27. The stop 98 is preferably 0.240 inch in diameter, which is wide enough to contact either the central rib 115 of a fastener 4, as shown in FIG. 26, or the two nearly central ribs 120 if the fastener 4 is reversed, as shown in FIG. 27. This permits clips C to be inserted into a magazine in any fashion, either nested or unnested. It is assumed that an operator will always place the clip C in the magazine 3 with the points 119 down, but he may inadvertently not place a new clip into the magazine so that the first fastener will nest with the last fastener in the magazine 3. The purpose of the stop means 98 is to allow the machine to operate without damage to it regardless of whether the succeeding clips are nested, as shown in FIG. 28, or oppose one another, as shown in FIG. 29.

The operation of the nailing machine shown in the drawings is believed to be apparent from the foregoing description. With the nailing machine M suitably attached to a source of compressed air at about 80 pounds per square inch and with the magazine 3 loaded with corrugated nails, in clips or separately, the parts are in the inoperative position shown in FIG. 2. In this position, compressed air from the reservoir 6 is free to enter the annular area 19 and passages 53 and 49a above the valve ball 43 and then into the recess 44, the passages 52 and 49 and the chamber 36, and is free to enter feeder tube 50. The pressure within the chamber 38 within the inner cylinder 13 beneath the piston 33 is at atmosphere, since in this position the large exhaust port 17 at the bottom of the cylinder 13 is open and the parts are in the position shown in FIG. 2. The pressure in the passage 51 of the feeder tube 50 keeps the poppet valve 57 down and the valve recovery bar 72 in its leftward position.

Figure 3:
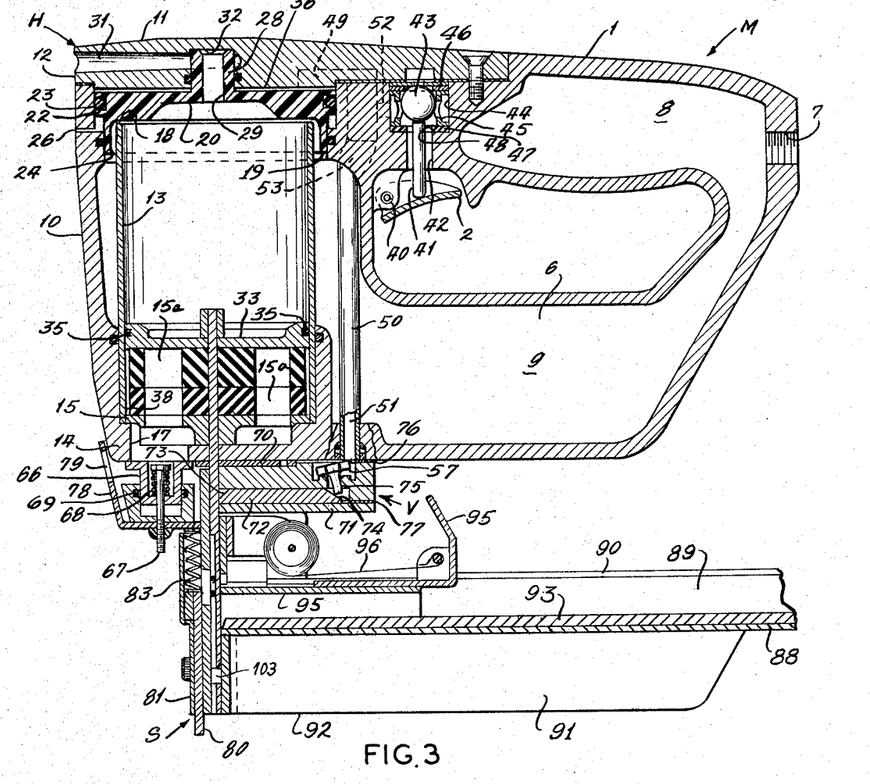
FIG. 3 is a fragmentary sectional view similar to that shown in FIG. 2, except that the main piston is in its downward movement and the main valve assembly and trigger are in their upper positions and the feed valve is shown in its rightward or rearward position.
Figure 4:
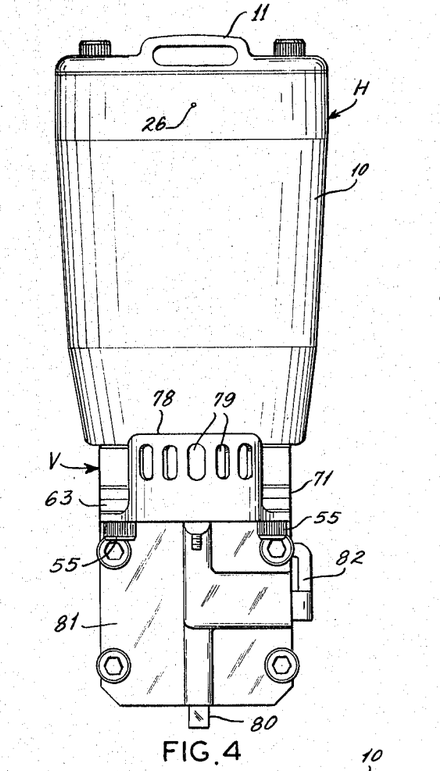
FIG. 4 is a front elevational view of said machine.

The operation will be explained after the safety device has first been operated. The operation of the safety device will then be explained. In operation, when the trigger 2 is actuated, or pivoted upwardly, the pin or plunger 41 lifts the normally closed valve ball 43, thereby exhausting the chamber 36 through the passages 49 and 52 and around the plunger 41, and sealing the opening in the upper washer 46 and cutting off all incoming air to the chamber 36 which would otherwise move through passages 52 and 49. The exhaust passage 42 surrounding the plunger 41 exhausts the air from the chamber 36 above the nylon piston or main valve assembly 20. At this time, the pressure in the reservoir 6, especially that portion surrounding the inner cylinder 13, acts on the lower peripheral edge 19 of the valve 20 outwardly of the cylinder 13 and causes the valve 20 to move up, and in so doing, the stem or upper flange 28 moves up against the seat 32 in the upper cap 11 to close the exhaust passage 29. When the pressure in the upper valve chamber 36 is less than the pressure on the underside of the main valve assembly 20, said valve 20 moves upwardly and unseats itself from the top edge 18 of the cylinder 13 to allow air pressure from the reservoir 6 to act on the top of the main piston 33. This forces the piston 33 downwardly with great force thereby driving the blade 5 downwardly to drive a nail or a corrugated fastener or other fastening means. As the main piston 33 and driving blade 5 begin their movement downwardly, the portion 103 of the driving blade 5 contacts the forward surface 73 and moves the recovery bar or slide block 72 rearwardly, or to the right as shown in FIGS. 2 and 3. The rear surface 74 of the slide block 72 tilts the poppet valve 57 and the parts remain in this position as the driving blade 5 moves upwardly when the trigger 2 is released.

When the poppet valve 57 is titled or raised so as to open, pressure from the feeder tube 50 passes into and through the upper hole 56 to the passages 62, the passages 64 in the valve block piston feeder 63, and beneath the relief valve 66 thereby moving it upwardly against the casing 10 so as to close the large exhaust port 17 to the atmosphere. However, this does not occur until the driving blade has completed its downward movement due to the size of the passages and the sequence of operations.

The return of the main piston 33 to its upper position is as follows. When the trigger 2 is released, the plunger 41 moves downwardly and the ball 43 moves downwardly seating against the opening 48 in lower washer 47 and closing the exhaust passage 42 around the plunger 41. In so doing, the ball 43 moves away from the opening 48 in the upper washer 46 to allow the re-admission of air to the chamber 36 through the passage 49, thereby forcing the valve 20 down, because of its larger diameter on its top, to re-seat on the top edge 18 of the cylinder 13. At the same time as the nylon valve 20 is being forced downwardly, the air between the O rings 23 and 25 is being expelled through one or more escape holes 26.

In the upper position as shown in FIG. 2, the driving blade 5 releases the slide block 72 and allows said block 72 to move forwardly (leftwardly as shown in FIG. 2) into the opening 103 upon the closing of the poppet valve 57, which prevents further air from coming in under the relief valve 66 and the main piston 33. The pressure from the feeder tube 50 upon the poppet valve 57, which contacts the rear cloping surface 74 of the valve recovery bar 72, and the pressure acting on said surface 74 forces the bar 72 leftwardly when the front portion thereof is free to enter the opening 103. The poppet valve 57 is then closed and the pressure in the reservoir 6 keeps it closed. Thus, friction and the driving blade 5 resting on the next nail to be driven keeps the piston 33 in its upper position.

The pressure under the piston 33 is a holding pressure far less than the operating pressure. When the poppet valve 57 seats, the pressure drops and the relief valve 66 moves downwardly because of the force exerted by the spring 68, which opens the large exhaust port 17 thereby bringing the chamber 38 beneath the piston 33 to atmosphere. The piston 33 and driving blade 5 remain in their upper position due to the frictional forces between the parts, and by the slide block 72 which is being held under the driving blade 5 by air pressure on the upper side of the poppet valve 57. The opening 17 beneath the piston 33 is very large that air can easily escape as the piston 33 is driven downwardly at a rapid rate. The lightness of the piston 33, the driving blade 5, and the weightless connection therebetween, is such that corrugated nail one inch wide requires only a pressure of 80 p.s.i.

The safety device S will now be described. Its purpose is to prevent corrugated nails from being driven unless the machine is in contact with a surface into which a nail can be driven. This prevents the machine M from shooting nails at a high velocity through the air, such as might occur if a workman accidentally presses the trigger 2 when the machine is being carried or is not in contact with a wood surface, etc. Any fastener shot from the machine into the air would be dangerous since it might cause injury to persons or damage to property either upon direct hit or ricochet.

The safety device S also has another advantage in operation. If the operator wishes, he may press the trigger 2 while the machine is being carried out of contact with any surface. Because of the safety device S, no nail will be driven. However, as soon as the operator depresses the foot 80 on the safety device S, a nail will be driven. Thus, an operator who depresses the trigger 2 when the machine is not in contact with anything can drive a nail when he touches the machine against a surface. This type of operation might be advantageous in certain situations. After a nail is driven, the trigger 2 must be released to permit the valve ball 43 to reseat thereby recycling the machine.

When the foot 80 of the trip safety device S is down, as shown in FIG. 2, the machine M will not operate when the trigger 2 is depressed. In the safety position, in which the machine will not operate, there is an open connection between the reservoir 6, the safety hole 16, the upper enlarged portion of the vertical safety hole 61, the lateral passage 60, the hole 59, the passage 58, the feeder tube passage 51, and the reservoir 6. Under such conditions, if the trigger 2 is depressed, nothing happens since the reservoir pressure is directed not only as explained in the operation of the machine, but also from the feeder tube passage 51 back into the reservoir 6 through the safety hole 16. In other words, in the safety position, depressing the trigger does not produce a pressure differential to move the main valve assembly 20 up and the main piston 33 down.

When the foot 80 of the trip safety device S is up, as shown in FIG. 3, the arm 82 and shaft 84 are raised so that the shaft 84 moves up to seat against the top sealing ring 87, thereby closing the connection between the safety hole 16 and the lateral passage 60. Thus, the feeder tube passage 51 is no longer in connection with the chamber 36 above the main valve assembly 20. The machine M is therefore free to operate as previously described.

Figures 24, 25:
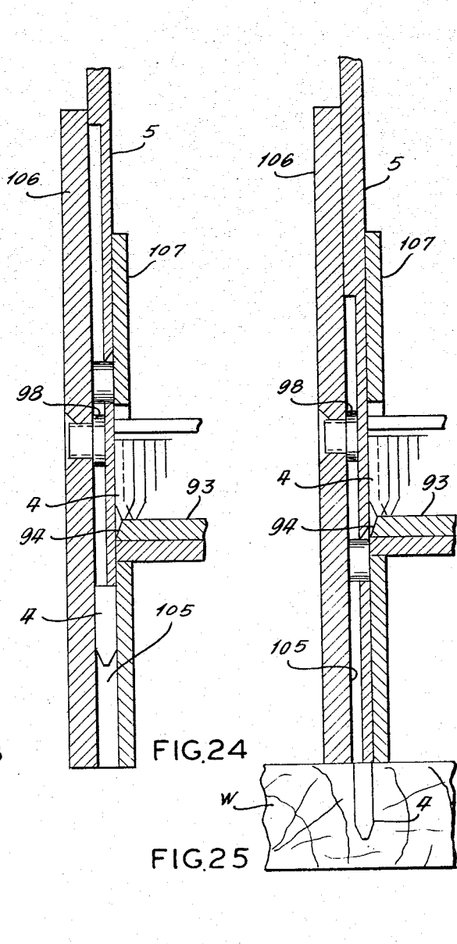

The operation and driving of the first fastener 4 is best shown sequentially in FIGS. 21-25 which show the driving blade 5 in its upper or normal inoperative position (FIG. 21), contacting the top of the first fastener 4 (but no other fastener) to start breaking it loose from the clip C (FIG. 22), pivoting the fastener over the forward sloping edge 94 of the magazine insert 93 (FIG. 23), positioning the fastener 4 in a vertical driving position (FIG. 24), and then in lower position of the driving blade 5 showing the fastener 4 after it has been driven into a workpiece W (FIG. 25). Thus, the first fastener 4 is first broken loose from the clip C, then pivoted and moved laterally forwardly to a driving position, and then driven home.

Figure 21:
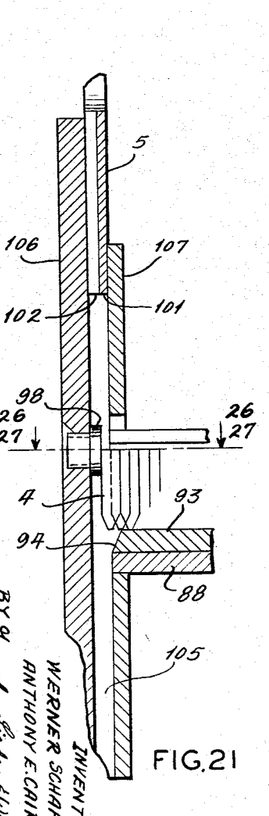
FIGS. 21–25 show the sequence of operations, with the driving blade in its upper position, then contacting the top of the first fastener, then breaking it loose and pivoting same, then driving it downwardly, and then in its lower position.
Figure 22:
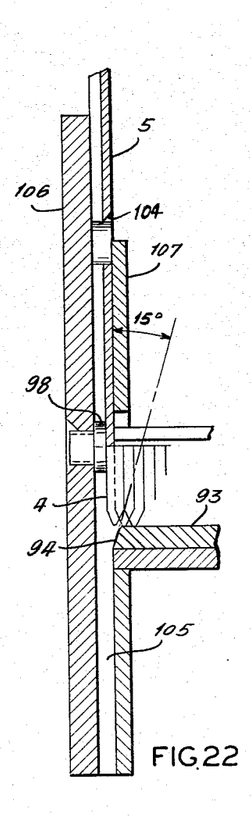
Figure 23:
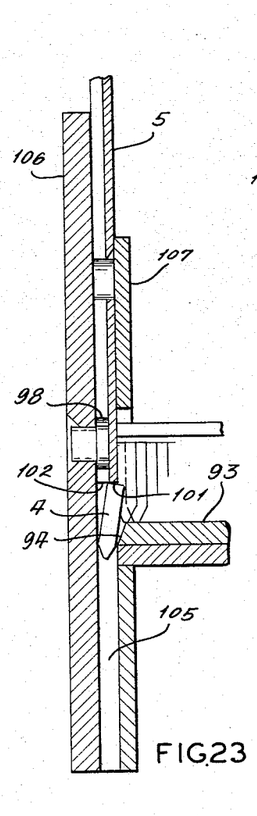

The front guide means 106 and rear guide means 107 form a vertical guide path 105 for the fastener 4 and the driving blade 5. The pusher 95 in the magazine 3 feeds corrugated fasteners forwardly to a position partially in said guide path 105 and partially beneath said driving blade 5 (FIG. 21). The corrugated fasteners have sloping bottom portions 118 terminating in points 119 which slide on the bottom or insert 93 which has the sloping forward edge 94. The guide means 106 has stop means 98 thereon extending partially into the guide path 105 for stopping the forward movement of said corrugated fasteners 4 and preventing the first fasteners from moving to a position completely beneath the driving blade 5 (FIG. 21). The stop means 98 is less in width than said corrugated fasteners but sufficiently wide to contact at least one rib in said fastener and stop said fastener in a position where its forward portion 112 is in the guide path 105 and its rear portion is above the sloping forward edge 94 of said magazine bottom 93. The driving blade 5 has a cut-out portion 97 for receiving the stop means 98 when the driving blade 5 is moved downwardly.

The present method of driving a corrugated fastener first positions the fastener partially beneath the driving blade (FIG. 21), then breaks the fastener loose from its clip (FIG. 22) and pivots the fastener (FIG. 23) to move it forwardly to a new vertical position (FIG. 24), and then drives said fastener with the full width of the driving blade 5. The blade 5 remains in contact with the top 123 of the fastener during the entire time. The rear 101 of the driving blade 5 first contacts the forward thickness 112 of the fastener 4 (FIG. 22) but after the fastener 4 is moved forwardly, the entire projected width of the blade 5 contacts the entire top 123 of the fastener 4, except of course, at the cut-out portion 97.

While the invention has been called a nailing machine, the word nail is used in its broadest sense and includes different kinds of fasteners including corrugated fasteners or any other kind which can be driven by a nailing or driving machine.

This invention is intended to cover all changes and modifications of the example of the invention herein chosen for purposes of the disclosure, which do not constitute departures from the spirit and scope of the invention.

What is claimed is:

1. In a driving machine having a driving blade therein, front and rear guide means in said machine forming a guide path for said driving blade, a magazine secured to said machine adapted to feed corrugated fasteners forwardly to a position partially in said guide path and partially beneath said driving blade, said magazine having a bottom with a sloping forward edge, said guide means having stop means connected thereto extending partially into said guide path for stopping the forward movement of said fasteners and preventing same from moving to a position completely beneath said driving blade, said stop means being less in width than said corrugated fasteners but sufficiently wide to contact at least one rib of said fastener and stop said fastener in a position where the entire thickness of the metal in the rib contacting said stop means is in said guide path and the rear portion of said fastener is above said sloping forward edge of the bottom of said magazine, said driving blade having a cut-out portion for receiving said stop means when said driving blade is moved downwardly.

2. In a driving machine having a driving blade therein, front and rear guide means in said machine forming a guide path for said driving blade, a magazine secured to said machine adapted to feed corrugated fasteners forwardly to a position partially in said guide path and partially beneath said driving blade, said corrugated fasteners having sloping bottom portions terminating in points, said magazine having a bottom on which said points of said corrugated fasteners slide, said bottom having a sloping forward edge, said front guide means having stop means thereon extending partially into said guide path for stopping the forward movement of said fasteners and preventing same from moving to a position completely beneath said driving blade, said stop means being less in width than said corrugated fasteners but sufficiently wide to contact at least one rib of said fastener and stop said fastener in a position where its forward portion is in said guide path and its rear portion is above said sloping forward edge of said magazine bottom, said driving blade having a cut-out portion for receiving said stop means when said driving blade is moved downwardly.

3. In a driving machine having a vertically movable driving blade therein, front and rear guide means in said machine forming a guide path for said driving blade, said front guide means having stop means connected thereto, a magazine secured to said machine adapted to feed corrugated fasteners of predetermined width forwardly toward said stop means to a position in which the forward portion of the first fastener is stopped by said stop means and is partially in said guide path and partially beneath said driving blade, said corrugated fasteners having sloping bottom portions terminating in points, said magazine having a bottom on which said corrugated fasteners slide, said bottom having a sloping forward edge, said stop means being less in width than said corrugated fasteners but sufficiently wide to contact at least one rib in said fastener regardless of which of its two corrugated surfaces is forward and stop said fastener in a position where its forward portion is in said guide path and its rear portion is above said sloping forward edge of said magazine bottom, said driving blade having a cut-out portion so that said blade can move by said stop means when said driving blade is moved downwardly.

References Cited by the Examiner

UNITED STATES PATENTS

| | | | |
|---|---|---|---|
| 1,108,279 | 8/1914 | Thompson | 227—120 XR |
| 2,059,021 | 10/1936 | Ponkonin | 227—121 XR |
| 2,401,840 | 6/1946 | Olson | 227—127 |
| 2,733,440 | 2/1956 | Jenny | 227—123 |
| 2,900,638 | 8/1959 | O'Kelley | 227—120 |
| 2,979,725 | 4/1961 | Wandel et al. | 227—130 XR |
| 3,086,207 | 4/1963 | Lingle et al. | 227—123 XR |

GRANVILLE Y. CUSTER, JR., *Primary Examiner.*